United States Patent
Hayashi et al.

(10) Patent No.: US 11,902,310 B2
(45) Date of Patent: Feb. 13, 2024

(54) DETECTION DEVICE AND DETECTION METHOD

(71) Applicant: Nippon Telegraph and Telephone Corporation, Tokyo (JP)

(72) Inventors: Yuhei Hayashi, Musashino (JP); Ichiro Kudo, Musashino (JP); Hiroshi Osawa, Musashino (JP); Takeaki Nishioka, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 349 days.

(21) Appl. No.: 17/431,863

(22) PCT Filed: Feb. 4, 2020

(86) PCT No.: PCT/JP2020/004102
§ 371 (c)(1),
(2) Date: Aug. 18, 2021

(87) PCT Pub. No.: WO2020/170802
PCT Pub. Date: Aug. 27, 2020

(65) Prior Publication Data
US 2021/0385241 A1 Dec. 9, 2021

(30) Foreign Application Priority Data
Feb. 19, 2019 (JP) ................................ 2019-027505

(51) Int. Cl.
*H04L 9/40* (2022.01)

(52) U.S. Cl.
CPC ...... *H04L 63/1425* (2013.01); *H04L 63/1416* (2013.01); *H04L 63/1466* (2013.01); *H04L 63/20* (2013.01)

(58) Field of Classification Search
CPC ............ H04L 63/1425; H04L 63/1416; H04L 63/1466; H04L 63/20
See application file for complete search history.

(56) References Cited

U.S. PATENT DOCUMENTS

2017/0126714 A1* 5/2017 Nooka ................ H04L 63/1425
2018/0152475 A1* 5/2018 Park ...................... G06N 3/088
(Continued)

FOREIGN PATENT DOCUMENTS

| JP | 2017147558 | 8/2017 |
| JP | 2018026747 | 2/2018 |
| WO | WO 2016002915 | 1/2016 |

OTHER PUBLICATIONS

Kazato et al., "A Study of Gini Importance-based Header Feature Selection Methods for Cyber Attack Detection," IEICE Technical Report, Dec. 2017, 117(353):91-96, 13 pages (With English Translation).

(Continued)

*Primary Examiner* — Han Yang
(74) *Attorney, Agent, or Firm* — Fish & Richardson P.C.

(57) ABSTRACT

A feature calculation unit calculates a feature of header information of a packet. A classification unit classifies the packet as a normal packet or an abnormal packet by using the calculated feature. An adding unit adds a label indicating a tool name of a known attack tool to header information of a packet attacked using the attack tool. A learning unit learns the addition of the label by using the label and the feature calculated for the packet to which the label has been added as teacher data.

4 Claims, 10 Drawing Sheets

(56) References Cited

U.S. PATENT DOCUMENTS

2021/0306357 A1* 9/2021 Onishi ............... H04L 63/0236
2023/0254234 A1* 8/2023 Hayashi ............... H04L 43/067
709/224

OTHER PUBLICATIONS keyman.or.jp, "Barracuda Web Application Firewall," Keyman's Net IT Media Inc., Dec. 4, 2018, retrieved from URL <http://www.keyman.or.jp/nwsec/waf/product/30973>, 13 pages (With English Translation).
modsecurity.org, "ModSecurity 3.0," retrieved on Jan. 15, 2019, retrieved from URL <https://www.modsecurity.org/>, 1 page.
Nishizuka, "DoS/DDoS Attack Detection/Countermeasure Technology at ISP," Internet Week 2013, Nov. 26, 2013, retrieved from URL <https://www.nic.ad.jp/ja/materials/iw/2013/proceedings/s2/s2-nishizuka.pdf>, 39 pages (With English Translation).
Qualys Inc., "Are You Ready for Slow Reading," Qualys Community, Jan. 5, 2012, retrieved from URL <https://blog.qualys.com/securitylabs/2012/01/05/slow-read>, 7 pages.

* cited by examiner

DETECTION DEVICE AND DETECTION METHOD

CROSS-REFERENCE TO RELATED APPLICATIONS

This application is a National Stage application under 35 U.S.C. § 371 of International Application No. PCT/JP2020/004102, having an International Filing Date of Feb. 4, 2020, which claims priority to Japanese Application Serial No. 2019-027505, filed on Feb. 19, 2019. The disclosure of the prior application is considered part of the disclosure of this application, and is incorporated in its entirety into this application.

TECHNICAL FIELD

The present disclosure relates to a detection device and a detection method.

BACKGROUND ART

In recent years, low-rate attacks, called HTTP Flood, Slow Denial Of Service (DoS) and the like, which have a small number of packets per unit time have become known. In addition, techniques for coping with such a low-rate attack are known. For example, a technique in which attack communication detected using xFlow is caused to flow into a security device is known (see Non Patent Literature 1). In addition, a technique in which a security device such as a web application firewall (WAF) is connected in-line to detect attack communication is known (see Non Patent Literature 2). In addition, a technique in which an attack is detected on a web server is known (see Non Patent Literatures 3 and 4). In addition, a technique for detecting a specific-type attack is known (see Patent Literatures 1 and 2).

CITATION LIST

Patent Literatures

Patent Literature 1: JP 2017-147558 A
Patent Literature 2: JP 2018-26747 A

Non Patent Literatures

Non Patent Literature 1: Kaname Nishizuka, "Detection and Countermeasure Technology for DoS/DDoS Attacks in ISP", [online], 2013, NTT Communications Corporation, [searched Jan. 15, 2019], Internet <URL: www.nic.ad.jp/ja/materials/iw/2013/proceedings/s2/s2-nishizuka.pdf>
Non Patent Literature 2: "Barracuda Web Application Firewall", [online], ITmedia Inc., [searched Jan. 15, 2019], Internet <URL: www.keyman.or.jp/nwsec/waf/product/30973>
Non Patent Literature 3: "Are you ready for slow reading?", [online], Qualys Inc., [searched Jan. 15, 2019], Internet <URL:blog.qualys.com/securitylabs/2012/01/05/slow-read>
Non Patent Literature 4: "ModSecurity 3.0", [online], Trustwave, [searched Jan. 15, 2019], Internet <URL: www.modsecurity.org/>

SUMMARY OF THE INVENTION

Technical Problem

However, it may be difficult to detect a low-rate attack with the existing techniques. For example, the technique described in Non Patent Literature 1 is a technique on the assumption that sampling of communication is performed, and thus information about a low-rate attack cannot be acquired, which results in a problem that no trigger is found for causing to flow into a security device. In addition, the technique described in Non Patent Literature 2 has a problem that a cost per Gbps of a security device is high, and the cost increases when normal communication is set to be a detection target. Further, the techniques described in Non Patent Literatures 3 and 4 have a problem that QoS in normal communication is affected or a load is applied to a Web server. Further, the techniques disclosed in Patent Literatures 1 and 2 have a problem that the type of attack that can be detected is limited, and an attack tool used for an attack cannot be determined.

The present disclosure has been made in view of the above-described circumstances, and an object is to easily detect and cope with a low-rate attack.

Means for Solving the Problem

In order to resolve the above-described problems and achieve the object, a detection device according to the present disclosure includes a feature calculation unit configured to calculate a feature of header information of a packet, and a classification unit configured to classify the packet as either a normal packet or an abnormal packet by using the calculated feature.

Effects of the Invention

According to the present disclosure, it is possible to easily detect and cope with a low-rate attack.

DESCRIPTION OF EMBODIMENTS

Hereinafter, an embodiment of the present disclosure will be described in detail with reference to the drawings. Note that the present disclosure is not limited by the embodiment. Further, in the description of the drawings, the same parts are denoted by the same reference numerals and signs.

Configuration of Detection System

Figure 1:
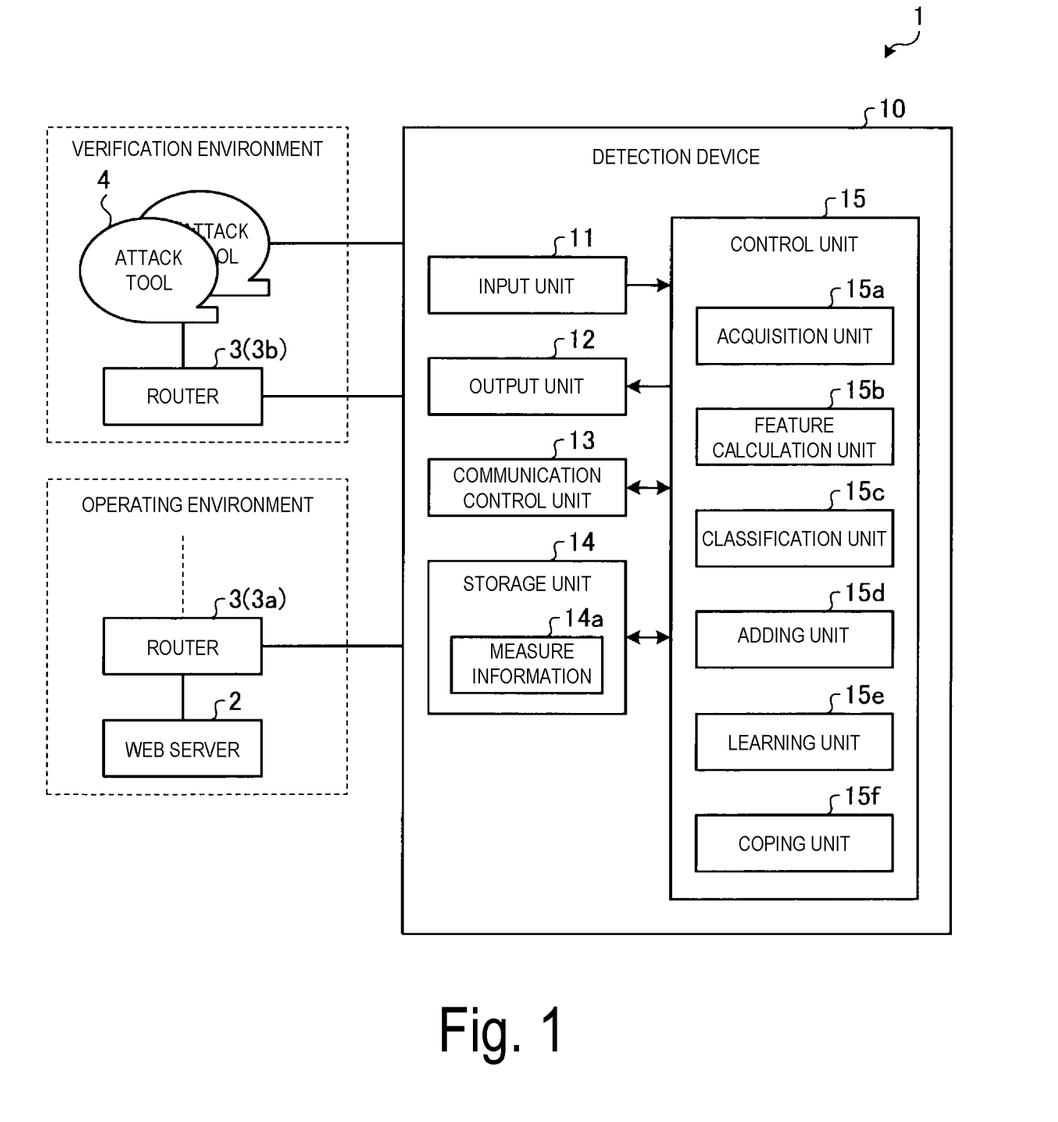
FIG. 1 is a schematic diagram illustrating an outline configuration of a detection system including a detection device according to the present embodiment.

FIG. 1 is a schematic diagram illustrating a schematic configuration of a detection system including a detection device according to the present embodiment. As illustrated in FIG. 1, a detection system 1 includes a router 3 and a detection device 10. The router 3 is implemented, for example, by a network processor (NP), a field programmable gate array (FPGA), or the like, and includes a router 3a in an operating environment and a router 3b in a verification environment. The router 3a in the operating environment is a transfer device that is connected to a Web server 2 in operation and transfers packets between the Web server 2 and a user. The router 3b in the verification environment is a transfer device that transfers a packet attacked using a known attack tool 4 to the detection device 10.

The detection device 10 detects an attack in an operating environment and the attack tool 4 used for the attack through learning using layer (L) 3 to L4 information of packets acquired from the router 3a in the operating environment and the router 3b in the verification environment by detection processing to be described later.

Figure 2:
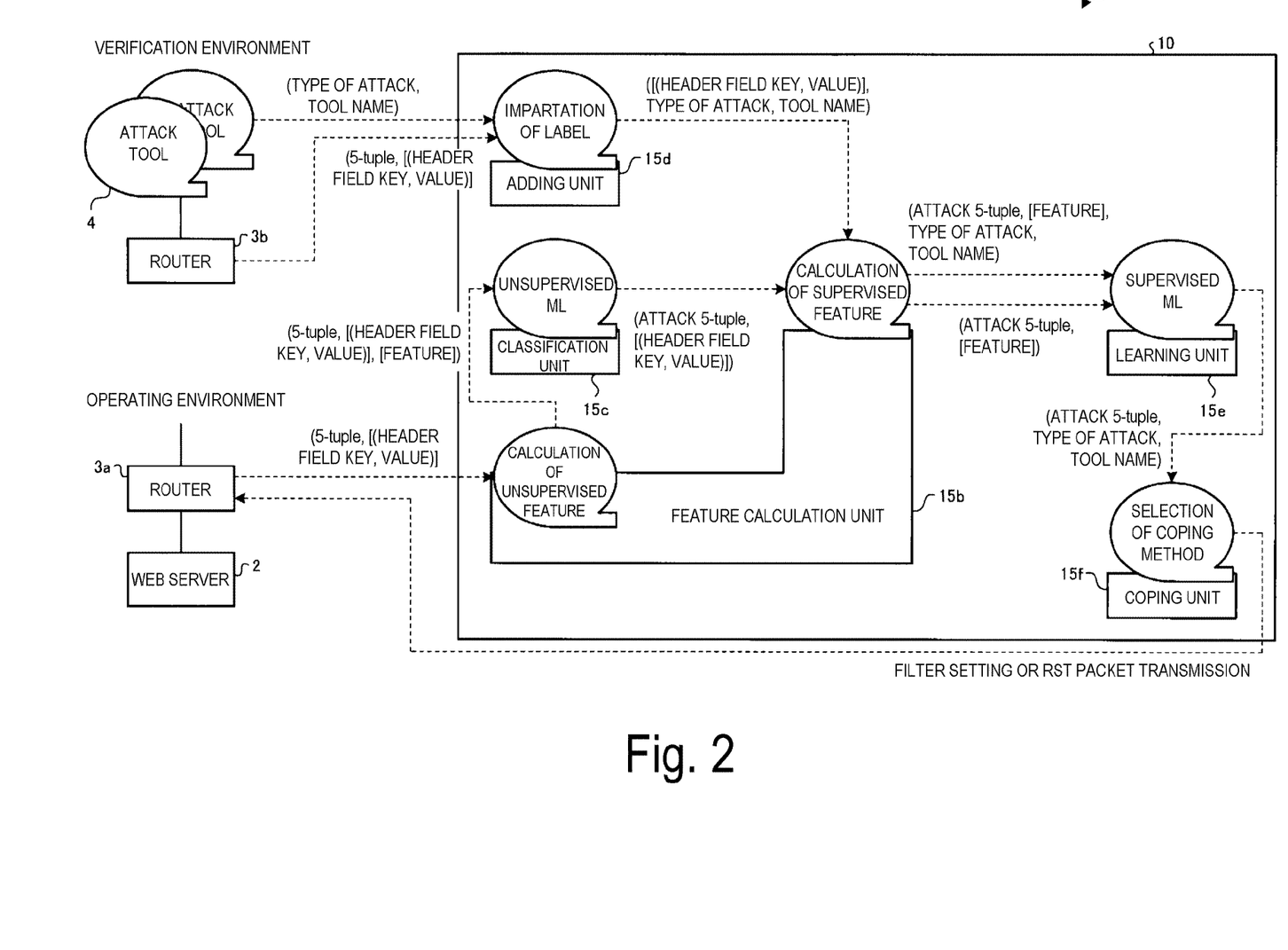
FIG. 2 is a diagram illustrating an outline of processing of the detection device.

Here, FIG. 2 is a diagram illustrating an outline of processing of the detection device 10. As will be described later in detail, the detection device 10 calculates a feature using L3 to L4 information such as a 5-tuple of a packet in an operating environment and a predetermined field value and performs unsupervised machine learning (ML; hereinafter referred to as learning) to classify a packet as a normal packet or an abnormal packet.

In addition, the detection device 10 acquires L3 to L4 information of packets attacked by the known attack tool 4 in a verification environment, adds a label indicating the type of attack of the attack tool 4 and a tool name to the information, and performs supervised learning using the information as teacher data to learn the addition of the label.

Thereby, the detection device 10 adds a label indicating the type of attack and a tool name to a packet classified as an abnormal packet among the packets in the operating environment. In addition, the detection device 10 selects a measure according to the type of detected attack and notifies the router 3a in the operating environment of the measure. For example, the detection device 10 instructs the router 3a to perform filter setting and transmit a reset (RST) packet.

Configuration of Detection Device

Description will return to FIG. 1. the detection device 10 is implemented by a general-purpose computer such as a personal computer and includes an input unit 11, an output unit 12, a communication control unit 13, a storage unit 14, and a control unit 15.

The input unit 11 is implemented by an input device such as a keyboard or a mouse and inputs various instruction information regarding the start of processing to the control unit 15 in response to an operation input by an operator. The output unit 12 is implemented by a display device such as a liquid crystal display or a printing device such as a printer.

The communication control unit 13 is implemented by a network interface card (NIC) or the like, and controls communication between an external device such as an IoT gateway 2 and the control unit 15 through an electric communication line such as a local area network (LAN) or the Internet.

The storage unit 14 is implemented by a semiconductor memory element such as a random access memory (RAM) or a flash memory, or a storage device such as a hard disk or an optical disc. A processing program for causing the detection device 10 to operate, data used during execution of the processing program, and the like are stored in the storage unit 14 in advance, or are temporarily stored every time processing is performed. For example, L3 to L4 information of packets acquired from the router 3 in detection processing to be described later, a threshold value of classification, parameters of models of learning results, measure information 14a, and the like are stored in the storage unit 14. Note that the storage unit 14 may be configured to communicate with the control unit 15 through the communication control unit 13.

The control unit 15 is implemented by a central processing unit (CPU) and the like and executes a processing program stored in a memory. Thereby, the control unit 15 functions as an acquisition unit 15a, a feature calculation unit 15b, a classification unit 15c, an adding unit 15d, a learning unit 15e, and a coping unit 15f as illustrated in FIG. 1. Note that each of or some of these functional units may be implemented by different pieces of hardware. For example, the coping unit 15f may be implemented in a device different from the other functional units. In addition, the control unit 15 may be configured to include other functional units.

The acquisition unit 15a acquires header information of a packet from the router 3. For example, the acquisition unit 15a extracts L3 to L4 information of a packet passing through the router 3.

Figure 3:
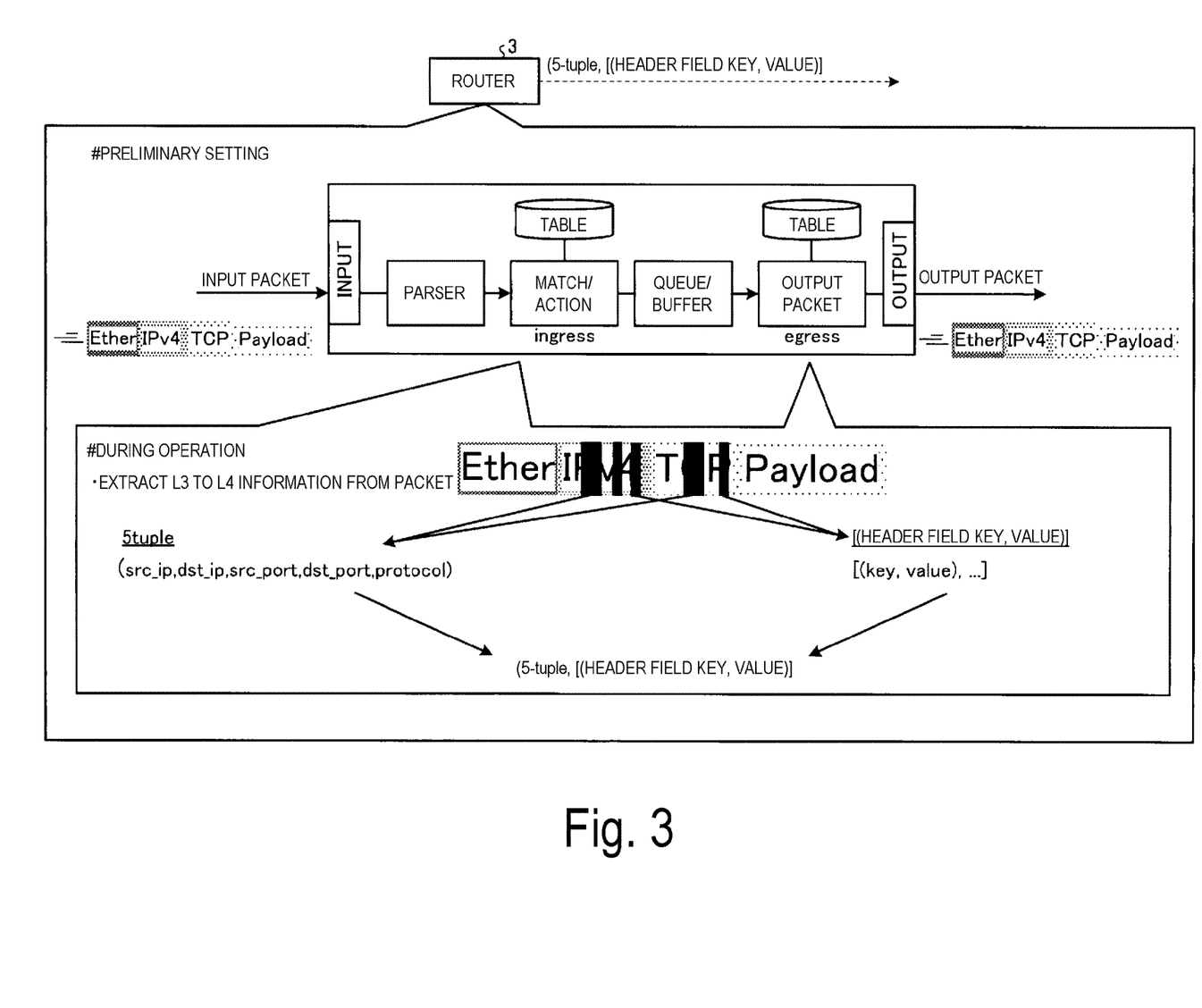
FIG. 3 is a diagram illustrating processing of the detection device.

Here, FIGS. 3 to 6 are diagrams illustrating the processing of the detection device 10. First, FIG. 3 illustrates the processing of the acquisition unit 15a. As illustrated in FIG. 3, the acquisition unit 15a loads a protocol stack (Ether, IPv4, TCP, and payload) of packets passing through the router 3 into a parser built into the detection device 10. Then, the acquisition unit 15a extracts the value of a 5-tuple of all packets and the value of a predetermined header field and loads the extracted values into a predetermined table of the storage unit 14.

Note that as illustrated in FIG. 3, the acquisition unit 15a may extract the value of a 5-tuple of packets passing through the router 3 and the value of a predetermined header field at the time of packet input (ingress) from the router 3, or the acquisition unit 15a may extract the values at the time of packet output (egress) to the router 3.

Here, the 5-tuple refers to a set of a transmission source IP address (src_ip), a transmission destination IP address (dst_ip), a transmission source port number (src_port), a transmission destination port number (dst_port), and a protocol. In addition, the predetermined header field is a header field to be focused. A header field key illustrated in FIG. 3 means a field name or the like for specifying a header field to be focused. As illustrated in FIG. 3, the number of header fields to be focused is not limited to one and may be two or more.

The feature calculation unit 15b calculates a feature of header information of a packet. Specifically, the feature calculation unit 15b calculates a feature for each 5-tuple by using the number of packets for each 5-tuple and a distribution of values of a predetermined header field. In addition, the classification unit 15c classifies a packet as either a normal packet or an abnormal packet using the calculated feature.

Figure 4:
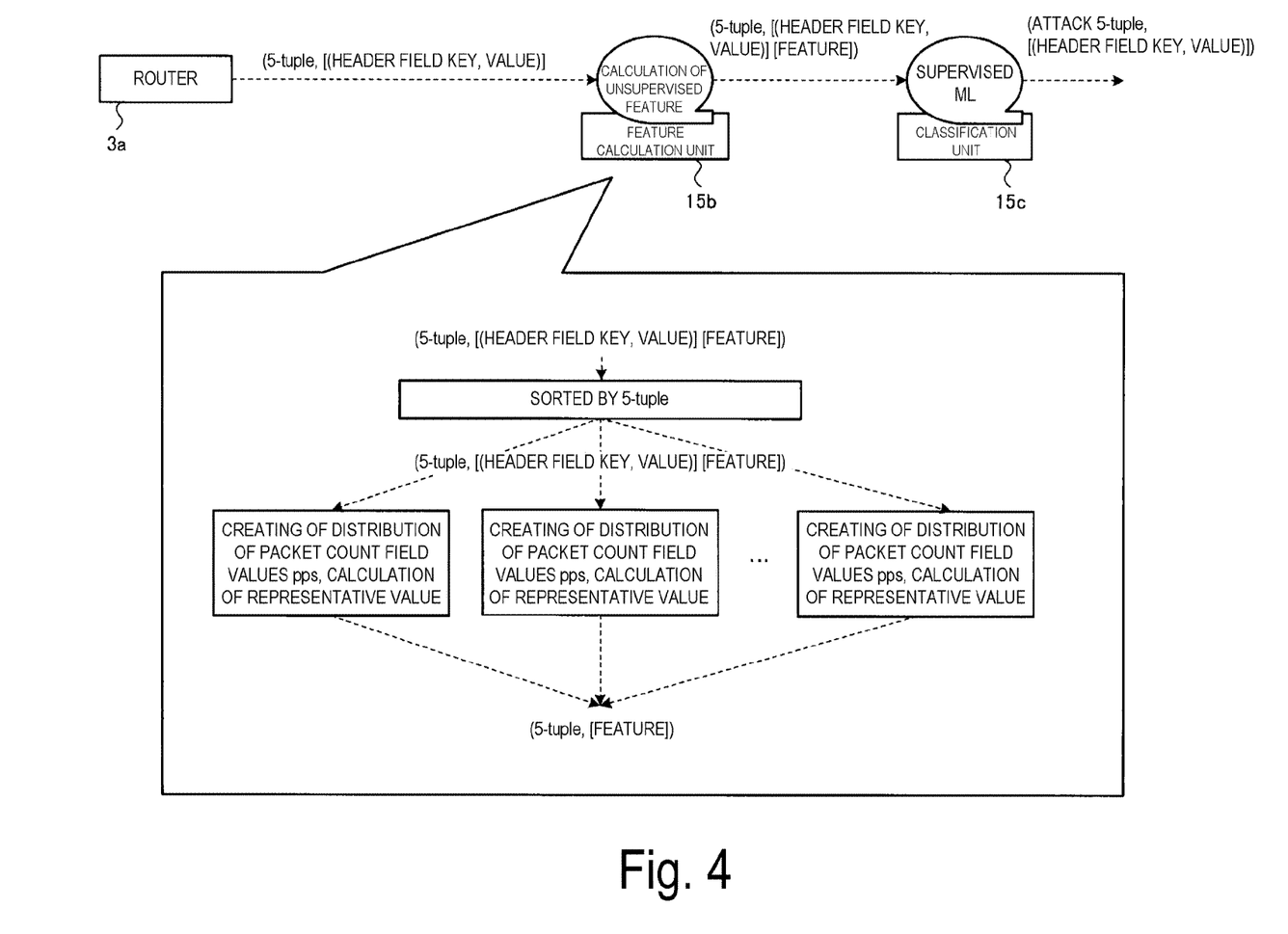
FIG. 4 is a diagram illustrating processing of the detection device.

Here, FIG. 4 illustrates processing of the feature calculation unit 15b and the classification unit 15c. As illustrated in FIG. 4, first, the feature calculation unit 15b calculates a feature using header information of a packet acquired by the acquisition unit 15a from the router 3a in an operating environment.

Specifically, the feature calculation unit 15b counts the number of packets for each 5-tuple and creates a distribution of values for each header field. In addition, the feature calculation unit 15b calculates a representative value such as an average value of a distribution, a variance, a maximum value, or a most frequent value, and packets per second (pps) at predetermined time intervals. Then, the feature calculation unit 15b calculates a feature for each 5-tuple by using a representative value of header fields of the respective 5-tuples and the packets per second. This feature is represented, for example, in a vector format.

Note that the feature calculation unit 15b calculates a feature and then clears a counter of the number of packets and a created distribution.

The classification unit 15c performs unsupervised learning using a feature for each 5-tuple calculated by the feature calculation unit 15b and classifies a score calculated from the feature for each 5-tuple as either a normal score or an abnormal score. For example, as a result of learning, the classification unit 15c stores a threshold value of the determined classification in the storage unit 14, and uses the threshold value as a threshold value of classification in the subsequent processing.

In FIG. 4, a case where a packet is classified as an abnormal packet is illustrated as an "attack 5-tuple". The classification unit 15c may output header information of a packet classified as an abnormal packet to an external management device or the like through the output unit 12 or the communication control unit 13 to give notice of abnormality.

Description will return to FIG. 1. The adding unit 15d adds a label indicating a tool name of the known attack tool 4 to header information of a packet that has been attacked using the attack tool. In addition, the learning unit 15e learns the addition of the label by using the label and the feature calculated for the packet to which the label has been added as teacher data.

Figure 5:
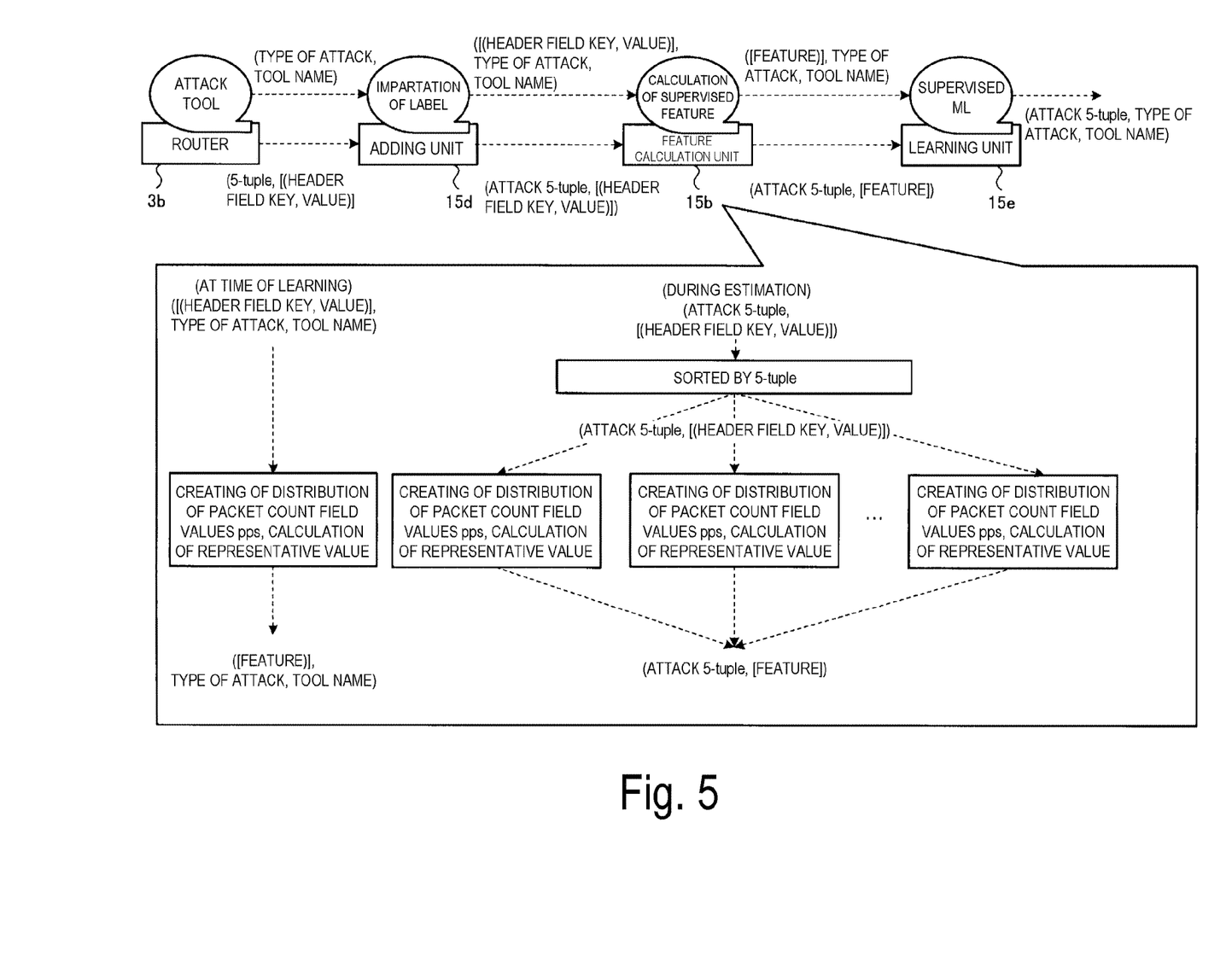
FIG. 5 is a diagram illustrating processing of the detection device.

Here, FIG. 5 illustrates processing of the adding unit 15d, the feature calculation unit 15b, and the learning unit 15e. As illustrated in FIG. 5, first, the adding unit 15d adds a label indicating the type of attack and a tool name of the attack tool 4 to header information of a packet that has been attacked using the known attack tool 4, the header information being acquired by the acquisition unit 15a from the router 3b in the verification environment.

Note that the label added by the adding unit 15d need not necessarily be both the type of attack and a tool name, and may be either one. For example, in a case where the type of attack can be uniquely specified from the tool name of the attack tool 4, the adding unit 15d may add only a label indicating the tool name.

In addition, the feature calculation unit 15b calculates a feature using header information of the packet to which the label has been added, as processing during learning. Specifically, the feature calculation unit 15b counts the number of packets, creates a distribution of values for each header field, and calculates a representative value and the packets per second (pps) at predetermined time intervals. Then, the feature calculation unit 15b calculates a feature of the packet to which the label has been added, using a representative value of each header field and the packets per second.

Then, the learning unit 15e performs supervised learning using the label and the feature calculated from the header information of the packet to which the label has been added as teacher data to learn the addition of the label to header information of the packet. For example, the learning unit 15e determines parameters of a model indicating a relationship between a label and a feature calculated using header information of a packet, and stores the parameters in the storage unit 14.

Note that FIG. 5 illustrates processing for calculating a feature using header information of a packet classified as an abnormal packet by the classification unit 15c as processing at the time of estimation by the feature calculation unit 15b. In this case, similar to the example illustrated in FIG. 4, the feature calculation unit 15b counts the number of packets for each 5-tuple, creates a distribution of values for each header field, and calculates a representative value of distributions and packets per second (pps) at predetermined time intervals. Then, the feature calculation unit 15b calculates a feature for each attack 5-tuple by using a representative value of each header field of each attack 5-tuple and the packets per second. Note that the example illustrated in FIG. 5 differs from the example illustrated in FIG. 4 only in that a 5-tuple of a packet to be processed is an attack 5-tuple.

Description will return to FIG. 1. The coping unit 15f selects a measure for the type of attack corresponding to a label with reference to measure information 14a of the storage unit 14 with respect to a packet which has been classified as an abnormal packet by the classification unit 15c and to which the label has been added by the learned learning unit 15e. The measure information 14a is information in which the type of attack of an attack tool and a measure are associated with each other.

Figure 6:
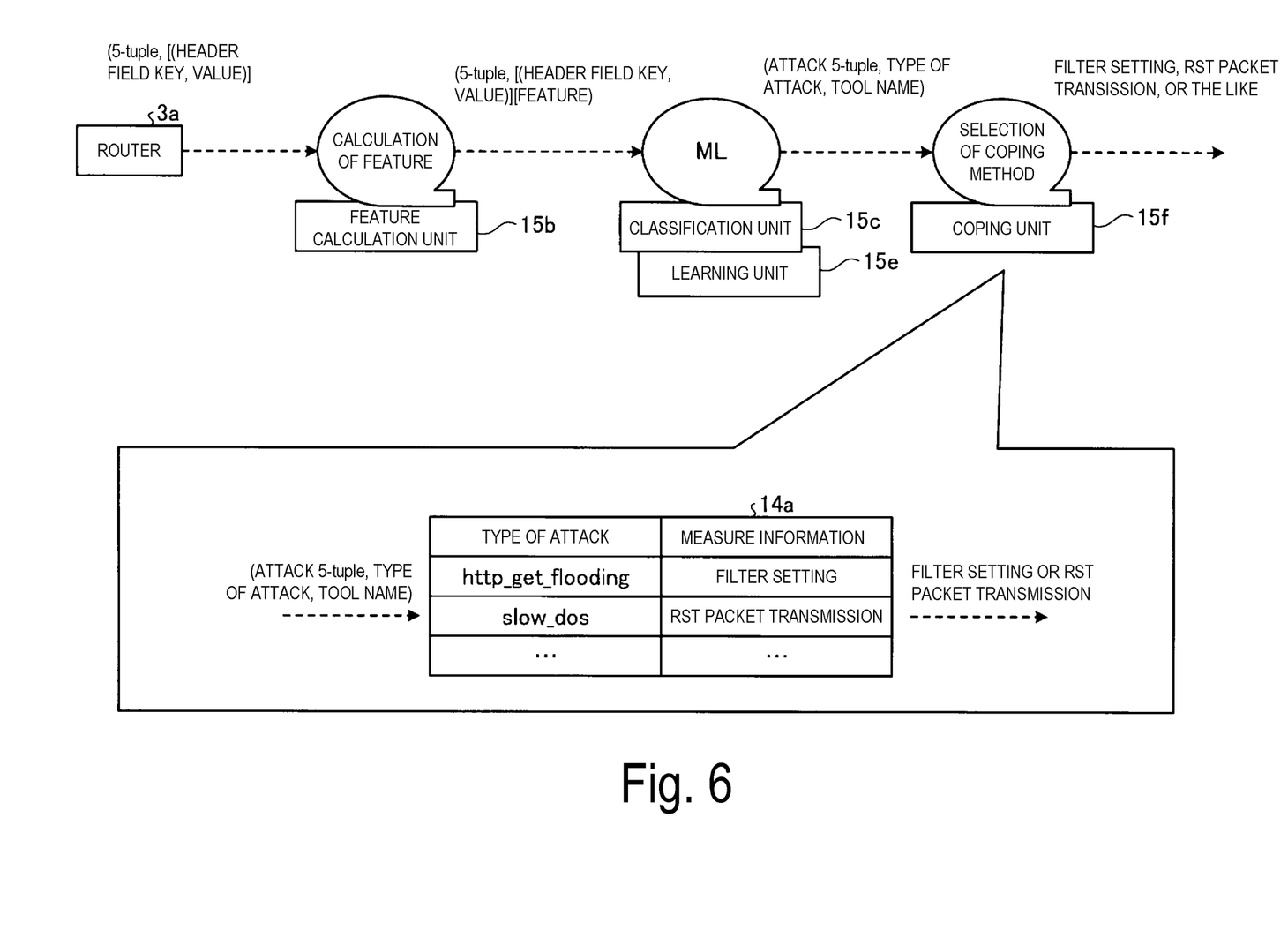
FIG. 6 is a diagram illustrating processing of the detection device.

Here, FIG. 6 illustrates processing for a packet in an operating environment. In the operating environment, first, the feature calculation unit 15b calculates a feature by using header information of a packet acquired from the router 3a in the operating environment by the acquisition unit 15a. Note that, in FIG. 6, the processing illustrated in FIG. 4 and the processing at the time of estimation illustrated in FIG. 5 are illustrated as the same processing without being distinguished from each other.

Next, the classification unit 15c classifies a score calculated from a feature for each 5-tuple as either a normal score or an abnormal score by using a feature for each 5-tuple calculated by the feature calculation unit 15b. In addition, the learning unit 15e learned as illustrated in FIG. 5 adds a label indicating the type of attack and the tool name of the attack tool 4 to header information of a packet classified as an abnormal packet. In this case, the learning unit 15e adds the label to the header information of the packet classified as an abnormal packet by using, for example, a model to which parameters stored in the storage unit 14 are applied.

Then, for a packet to which a label indicating the type of attack and the tool name of the attack tool 4 has been added, the coping unit 15f selects a measure for the type of attack corresponding to the label with reference to the measure information 14a. As illustrated in FIG. 6, the measure information 14a is information in which the type of attack such as "http_get_flooding" and "slow_dos" and a measure such as "filter setting" and "RST packet transmission" are associated with each other.

The coping unit 15f selects "filter setting" as a measure, for example, in a case where the type of attack of the attack tool 4 indicated by a label is "http_get_flooding". Then, the coping unit 15f notifies the router 3a of the selected measure. Thereby, the router 3a in the operating environment can perform appropriate coping for a detected attack.

Detection Processing

Figure 7:
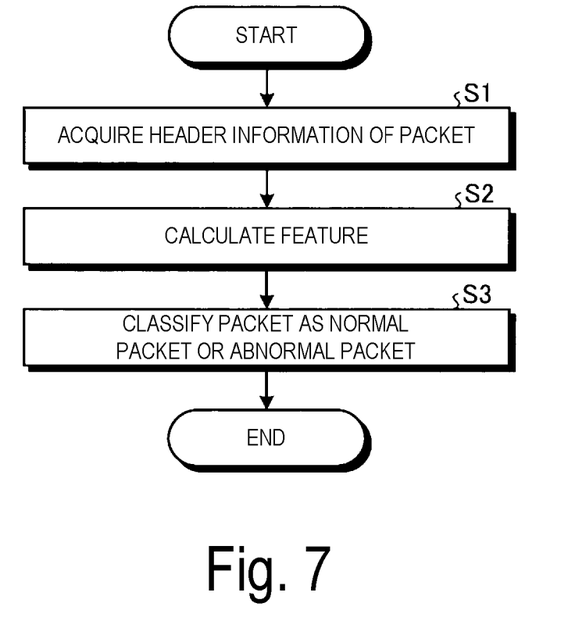
FIG. 7 is a flowchart illustrating a detection processing procedure performed by the detection device.
Figure 8:
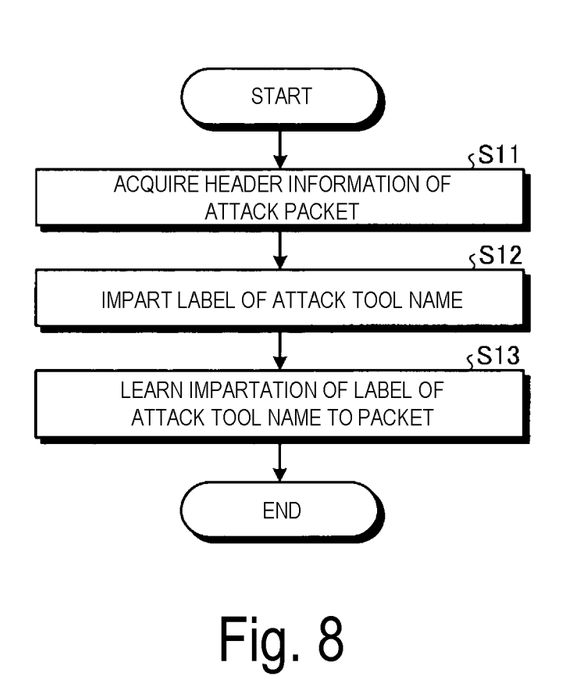
FIG. 8 is a flowchart illustrating a detection processing procedure performed by the detection device.
Figure 9:
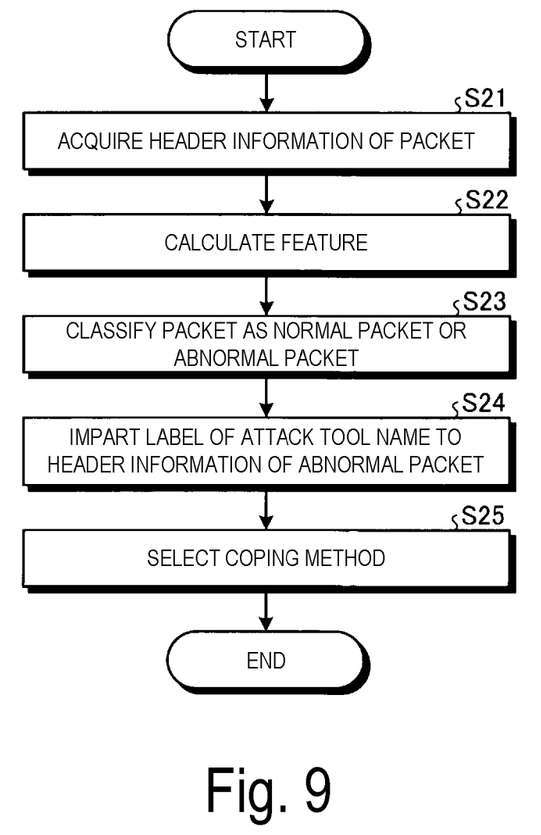
FIG. 9 is a flowchart illustrating a detection processing procedure performed by the detection device.

FIGS. 7 to 9 are flowcharts illustrating a detection processing procedure performed by the detection device 10. First, a classification processing procedure in an operating environment is illustrated in FIG. 7. The flowchart of FIG.

7 starts, for example, at a timing at which a user inputs an operation of giving a start instruction.

First, the acquisition unit 15a acquires header information of a packet from the router 3a in the operating environment (step S1). For example, the acquisition unit 15a extracts L3 to L4 information of a packet passing through the router 3a.

Next, the feature calculation unit 15b calculates a feature of the header information of the packet (step S2). Specifically, the feature calculation unit 15b calculates a feature for each 5-tuple by using the number of packets for each 5-tuple and a distribution of values of a predetermined header field.

Next, the classification unit 15c classifies a packet as either a normal packet or an abnormal packet using the calculated feature (step S3). Specifically, the classification unit 15c classifies a score calculated from the feature for each 5-tuple calculated by the feature calculation unit 15b as either a normal score or an abnormal score. The classification unit 15c determines, for example, a threshold value of classification during learning and uses the determined threshold value as a threshold value of classification in the subsequent processing.

The classification unit 15c may output header information of the packet classified as an abnormal packet to an external management device or the like through the output unit 12 or the communication control unit 13 to give notice of abnormality. Thereby, a series of processes is terminated.

Next, FIG. 8 illustrates a learning processing procedure of label addition. The flowchart of FIG. 8 starts, for example, at a timing at which a user inputs an operation of giving a start instruction.

First, the acquisition unit 15a acquires header information of a packet attacked using the known attack tool 4 from the router 3b in the verification environment (step S11). For example, the acquisition unit 15a extracts L3 to L4 information of a packet transmitted from the router 3b.

Next, the adding unit 15d adds a label indicating the tool name of the attack tool 4 to the header information of the attacked packet (step S12).

In addition, the feature calculation unit 15b calculates a feature using the header information of the packet to which the label has been added. Then, the learning unit 15e learns the addition of the label by using the label and the calculated feature for the packet to which the label has been added, as teacher data (step S13). The learning unit 15e determines, for example, parameters of a model indicating a relationship between the label and the feature calculated using the header information of the packet and stores the determined parameters in the storage unit 14. Thereby, a series of processes is terminated.

Next, FIG. 9 illustrates a processing procedure for a packet in an operating environment. The flowchart of FIG. 9 starts, for example, at a timing at which a user inputs an operation of giving a start instruction.

First, the acquisition unit 15a acquires header information of a packet from the router 3a in the operating environment (step S21). For example, the acquisition unit 15a extracts L3 to L4 information of the packet passing through the router 3a.

Next, the feature calculation unit 15b calculates a feature of the header information of the packet (step S22). Specifically, the feature calculation unit 15b calculates the feature for each 5-tuple by using the number of packets for each 5-tuple and a distribution of values of a predetermined header field.

Next, the classification unit 15c classifies a packet as either a normal packet or an abnormal packet by using the calculated feature (step S23). Specifically, the classification unit 15c classifies a score calculated from the feature for each 5-tuple which is calculated by the feature calculation unit 15b as either a normal score or an abnormal score.

Next, the learned learning unit 15e adds a label indicating the type of attack and the tool name of the attack tool 4 to header information of the packet classified as an abnormal packet (step S24). In this case, the learning unit 15e adds a label to header information of the packet classified as an abnormal packet by using, for example, a model to which parameters stored in the storage unit 14 are applied.

Then, the coping unit 15f selects a measure for the type of attack corresponding to the label with reference to the measure information 14a (step S25). In addition, the coping unit 15f outputs the selected measure to the router 3a. Thereby, a series of processes is terminated, and the router 3a in the operating environment can perform appropriate coping for a detected attack.

As described above, in the detection device 10 according to the present embodiment, the feature calculation unit 15b calculates a feature of header information of a packet. Specifically, the feature calculation unit 15b calculates a feature by using the number of packets for each 5-tuple and a distribution of values of a predetermined header field. In addition, the classification unit 15c classifies a packet as either a normal packet or an abnormal packet by using the calculated feature.

Thereby, it is possible to easily detect a low-rate attack at low cost without requiring both sampling of a packet and processing on the Web server 2 side. In this manner, according to the detection device 10, it is possible to easily detect and cope with a low-rate attack.

In addition, the adding unit 15d also adds a label indicating a tool name of a known attack tool to header information of a packet attacked using the attack tool. Furthermore, the learning unit 15e learns the addition of the label by using a label and a feature calculated for a packet to which the label has been added, as teacher data. Thereby, it is possible to estimate an attack tool by detecting various attacks. Thus, the router 3a in the operating environment can perform appropriate coping to block attack communication.

In addition, the storage unit 14 stores the measure information 14a in which the type of attack of an attack tool and a measure are associated with each other. Furthermore, the coping unit 15f selects a measure for the type of attack corresponding to a label with reference to the storage unit 14 with respect to a packet which has been classified as an abnormal packet by the classification unit 15c and to which the label has been added by the learned learning unit 15e. Thereby, the router 3a in the operating environment can easily execute appropriate coping.

Program

It is also possible to detect a program in which processing executed by the detection device 10 according to the embodiment described above is written in a computer-executable language. As an embodiment, the detection device 10 can be mounted by installing a detection program executing the above-described detection processing in a desired computer as packaged software or online software. For example, an information processing device can be made to function as the detection device 10 by causing the information processing device to execute the above-described detection program. The information processing device mentioned here includes a desktop or laptop-type personal computer. Furthermore, on top of that, a mobile communication terminal such as a smart phone, a mobile phone, or a personal handyphone system (PHS), a slate terminal such as a personal digital assistant (PDA), and the like are included in the category of the information processing device. In addition, the functions of the detection device 10 may be mounted in a cloud server.

Figure 10:
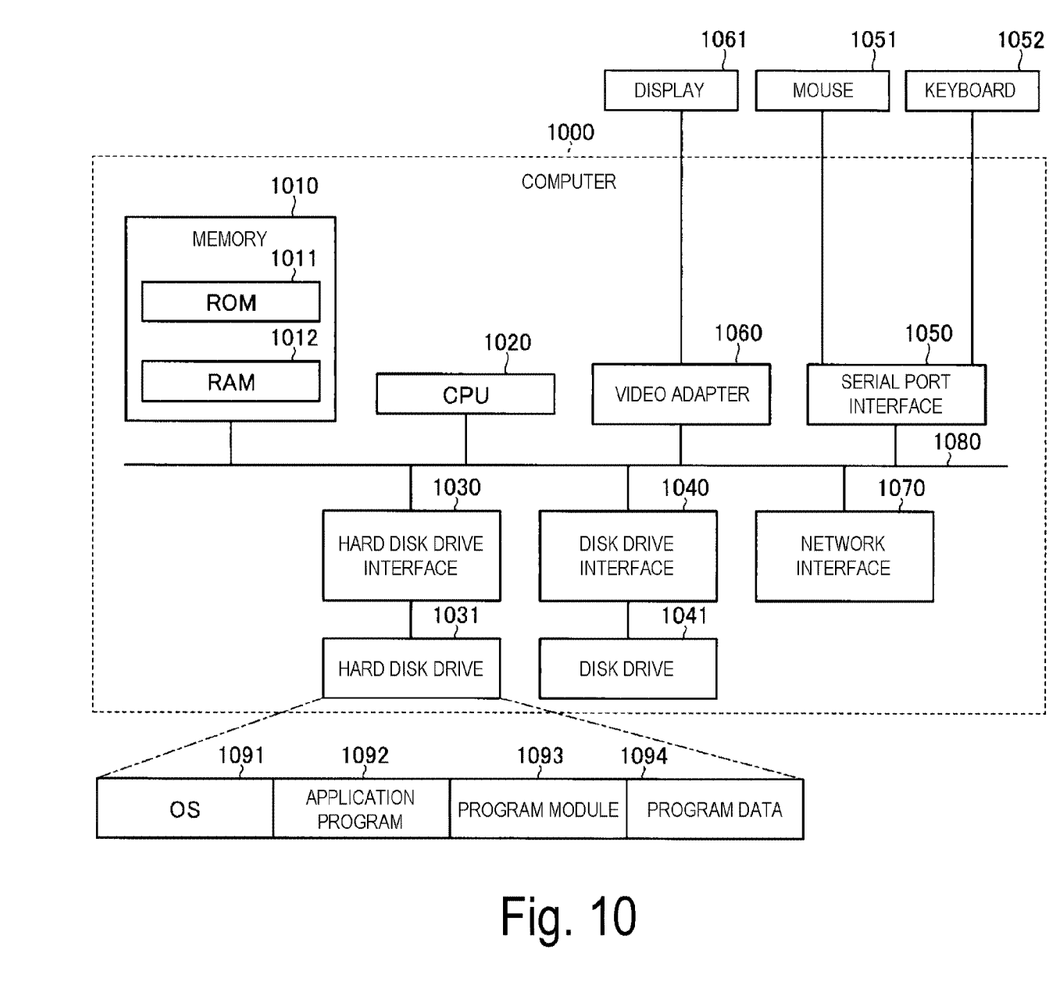
FIG. 10 is a diagram illustrating an example of a computer that executes a detection program.

FIG. 10 is a diagram illustrating an example of a computer that executes a detection program. A computer 1000 includes, for example, a memory 1010, a CPU 1020, a hard disk drive interface 1030, a disk drive interface 1040, a serial port interface 1050, a video adapter 1060, and a network interface 1070. These parts are connected to each other through a bus 1080.

The memory 1010 includes a read only memory (ROM) 1011 and a RAM 1012. The ROM 1011 stores, for example, a boot program such as a basic input output system (BIOS). The hard disk drive interface 1030 is connected to a hard disk drive 1031. The disk drive interface 1040 is connected to a disk drive 1041. For example, a detachable storage medium such as a magnetic disk or an optical disc is inserted into the disk drive 1041. For example, a mouse 1051 and a keyboard 1052 are connected to the serial port interface 1050. For example, a display 1061 is connected to the video adapter 1060.

Here, the hard disk drive 1031 stores, for example, an OS 1091, an application program 1092, a program module 1093, and program data 1094. The respective pieces of information described in the above-described embodiment are stored in, for example, the hard disk drive 1031 and the memory 1010.

In addition, for example, the detection program is stored in the hard disk drive 1031 as the program module 1093 in which commands to be executed by the computer 1000 are described. Specifically, the program module 1093 in which each processing executed by the detection device 10 described in the above-described embodiment is described is stored in the hard disk drive 1031.

Furthermore, data to be used in information processing according to the detection program is stored, for example, in the hard disk drive 1031 as the program data 1094. Then, the CPU 1020 reads the program module 1093 or the program data 1094 stored in the hard disk drive 1031 into the RAM 1012 as needed and executes each of the above-described procedures.

Note that the program module 1093 or the program data 1094 related to the detection program is not limited to being stored in the hard disk drive 1031. For example, the program module 1093 or the program data 1094 may be stored on a detachable storage medium and read by the CPU 1020 through the disk drive 1041 or the like. Alternatively, the program module 1093 or the program data 1094 related to the detection program may be stored in another computer connected through a network such as a LAN or a wide area network (WAN) and read by the CPU 1020 through the network interface 1070.

Although the embodiment to which the invention made by the present inventors is applied has been described above, the present disclosure is not limited by the description and the drawings constituting a part of the disclosure of the present disclosure according to the embodiment. In other words, all of other embodiments, examples, operation technologies, and the like made by those skilled in the art based on the present embodiment fall within the scope of the present disclosure.

REFERENCE SIGNS LIST

1 Detection system
2 Web server
3, 3*a*, 3*b* Router
10 Detection device
11 Input unit
12 Output unit
13 Communication control unit
14 Storage unit
14*a* Measure information
15 Control unit
15*a* Acquisition unit
15*b* Feature calculation unit
15*c* Classification unit
15*d* Adding unit
15*e* Learning unit
15*f* Coping unit

The invention claimed is:

1. A detection device comprising:
a feature calculation unit, including one or more processors, configured to calculate a feature of header information of a packet by using a number of packets on a per 5-tuple basis and a distribution of values of a predetermined header field;
a classification unit, including one or more processors, configured to classify the packet as either a normal packet that is not attacked by an attacker or an abnormal packet that is attacked by an attacker by comparing the calculated feature to a threshold value of classification;
an adding unit, including one or more processors, configured to add a label indicating a tool name of a known attack tool to header information of an attacked packet that is attacked using the known attack tool; and
a learning unit, including one or more processors, configured to:
use the label added to the attacked packet and the feature calculated for the attacked packet as teach data, and
learn a model for adding labels to packets, wherein the learned model indicates a relationship between each label and the calculated features of a corresponding packet.

2. The detection device according to claim 1, further comprising:
a storage medium configured to store measure information in which a type of attack of the attack tool and a measure are associated; and
a coping unit, including one or more processors, configured to select a measure for the type of attack corresponding to the label with reference to the storage medium with respect to the packet which has been classified as an abnormal packet by the classification unit and to which the label has been added by the learning unit using the learned model.

3. A detection method that is performed by a detection device, the detection method comprising:
calculating a feature of header information of a packet by using a number of packets on a per 5-tuple basis and a distribution of values of a predetermined header field; and
classifying the packet as either a normal packet that is not attacked by an attacker or an abnormal packet that is attacked by an attacker by comparing the calculated feature to a threshold value of classification;
adding a label indicating a tool name of a known attack tool to header information of an attacked packet that is attacked using the known attack tool;
using the label added to the attacked packet and the feature calculated for the attacked packet as teach data; and learning a model for adding labels to packets, wherein the learned model indicates a relationship between each label and the calculated features of a corresponding packet.

4. The detection method according to claim 3, further comprising:
storing measure information in which a type of attack of the attack tool and a measure are associated; and
selecting a measure for the type of attack corresponding to the label with reference to the stored measure information with respect to the packet which has been classified as an abnormal packet and to which the label has been added using the learned model.

\* \* \* \* \*